United States Patent [19]
Kawamura et al.

[11] Patent Number: 5,797,686
[45] Date of Patent: Aug. 25, 1998

[54] WHEEL BEARING DEVICE

[75] Inventors: Motoshi Kawamura, Nara-Ken; Masaru Goto, Yamatokoriyama, both of Japan

[73] Assignee: Koyo Seiko Co., Ltd., Chuo-Ku, Japan

[21] Appl. No.: 903,926

[22] Filed: Jul. 31, 1997

[30] Foreign Application Priority Data

Jul. 31, 1996 [JP] Japan ................. 8-219359

[51] Int. Cl.$^6$ ................. F16C 13/00; F16C 33/00
[52] U.S. Cl. ................. 384/544; 384/506; 384/542
[58] Field of Search ................. 384/499, 502, 384/504, 505, 506, 512, 513, 515, 517, 519, 537, 542, 543, 544

[56] References Cited

U.S. PATENT DOCUMENTS

| | | | |
|---|---|---|---|
| 2,121,237 | 6/1938 | Smith | 384/504 |
| 4,835,829 | 6/1989 | Welschof et al. | 384/504 X |
| 4,990,000 | 2/1991 | Harsdorff | 384/542 |
| 5,011,233 | 4/1991 | Nomura et al. | 301/108 R |

*Primary Examiner*—Thomas R. Hannon
*Attorney, Agent, or Firm*—Reid & Priest LLP

[57] ABSTRACT

A wheel bearing device is provided in which the cutting amounts of end faces in a simultaneous process substantially balance with each other, so that a polishing process is facilitated and the tightening axial force of a nut can be stabilized.

A wheel bearing device has an outer race which serves also as a housing; an inner race which serves also as a shaft; an inner race member which is fittingly fixed to the shaft which is the inner race; rolling elements and a cage which are disposed in an annular space between the outer race, and the inner race and the inner race member; and a nut which fixes the inner race member to the inner race by an axial force. In the wheel bearing device, the inner race member is formed so that the area of an end face abutting against a step portion of the shaft of the inner race is substantially equal to the area of an end face abutting against a bearing surface of the nut. The step portion is formed so that an outer peripheral end of the end face abutting against the bearing surface of the nut is positioned inside an end of the bearing surface of the nut.

1 Claim, 3 Drawing Sheets

WHEEL BEARING DEVICE

BACKGROUND OF THE INVENTION

The invention relates to a wheel bearing device which is used in a hub unit of an automobile, or the like, and particularly to a wheel bearing device in which a polishing process can be easily conducted on an inner race member and an axial force exerted during an assembly process can be stabilized.

As shown in FIG. 4, a wheel bearing device to which a wheel of an automobile is to be attached comprises: an outer race 1 which has a flange portion 1f in an outer side and which is to be attached to the body of the automobile; an inner race 2 which has a flange portion 2f in an outer side and to which a wheel is to be attached; an inner race member 13 which is fittingly fixed to a shaft 2s of the inner race 2; balls (rolling elements) 5 which are disposed in an annular space 4 between the outer race 1, and the inner race 2 and the inner race member 13; cages 6 which hold the balls 5; and seal members 7 and 9 which seal the annular space 4.

The inner race member 13 functions as an inner race. The inner race member is separately formed and then fittingly fixed to the flanged inner race 2 because the arrangement of the balls 5 and the like, easiness of the process of working a raceway surface 13a, and the like must be considered. The inner race member 13 is fitted onto the shaft 2s of the inner race 2, and then tightened and fixed by a nut 8 so as to exert a constant axial force.

One end face 13b of the inner race member 13 which constitutes the wheel bearing device abuts against a step portion 2b formed on the inner race 2, and the other end face 13c abuts against a bearing surface 8a of the nut 8, thereby stabilizing the axial force. The abutting faces, i.e., the end faces 13b and 13c of the inner race member 13 must be (polishing) processed as accurately as possible. In the inner race member 13, as shown in FIG. 5, the radial length C of the one end face 13b is largely different from the radial length D of the other end face 13c, or the areas of the end faces are largely different from each other. During the polishing process, the lateral end faces 13b and 13c of the inner race member 13 are simultaneously processed, and hence the cutting amounts of the faces are different from each other, thereby producing a problem in that it is difficult to control the accuracy. When the inner race member 13 is fixed to the inner race 2, the bearing surface 8a of the nut 8 abuts against the end face 13c. Because of the method of processing the nut, burrs are easily formed at the end 8a' of the bearing surface 8a. When the inner race member is tightened by the nut 8, the burrs may be bitten. This produces a problem in that the axial force is varied.

SUMMARY OF THE INVENTION

The invention has been conducted in view of the above-discussed problems. It is an object of the invention to provide a wheel bearing device in which the cutting amounts of the end faces in a simultaneous process substantially balance with each other, so that a polishing process is facilitated and the tightening axial force of a nut can be stabilized.

In order to solve the above-discussed problems, it is an object of the invention to provide a wheel bearing device comprising: an outer race which serves also as a housing; an inner race which serves also as a shaft; an inner race member which is fittingly fixed to the shaft which is the inner race; rolling elements and a cage which are disposed in an annular space between the outer race, and the inner race and the inner race member; and a nut which fixes the inner race member to the inner race by a constant axial force, wherein the inner race member is formed so that the area of an end face abutting against a step portion of the shaft of the inner race is substantially equal to the area of an end face abutting against a bearing surface of the nut, and the step portion is formed so that an outer peripheral end of the end face abutting against the bearing surface of the nut is positioned inside an end of the bearing surface of the nut. When the end faces of the inner race member of the wheel bearing device are formed so as to have a substantially same area in this way, the cutting amounts of the end faces in a polishing process are substantially equal to each other and hence the process is facilitated, thereby improving the process accuracy. When the step portion is formed on a side face of the inner race member which abuts against the bearing surface of the nut so that the areas of the end faces are substantially equal to each other, and the inner race member is fitted onto the shaft of the inner race and tightened by the nut, the end of the bearing surface where burs may be formed does not make direct contact with the end face of the inner race member. Therefore, the axial force exerted when the inner race member is tightened to the inner race is constant, and hence the accuracy of the assembly of the wheel bearing device can be easily controlled.

DETAILED DESCRIPTION OF THE PREFERRED EMBODIMENT

Hereinafter, a specific embodiment of the invention will be described with reference to the accompanying drawings.

Figure 1:
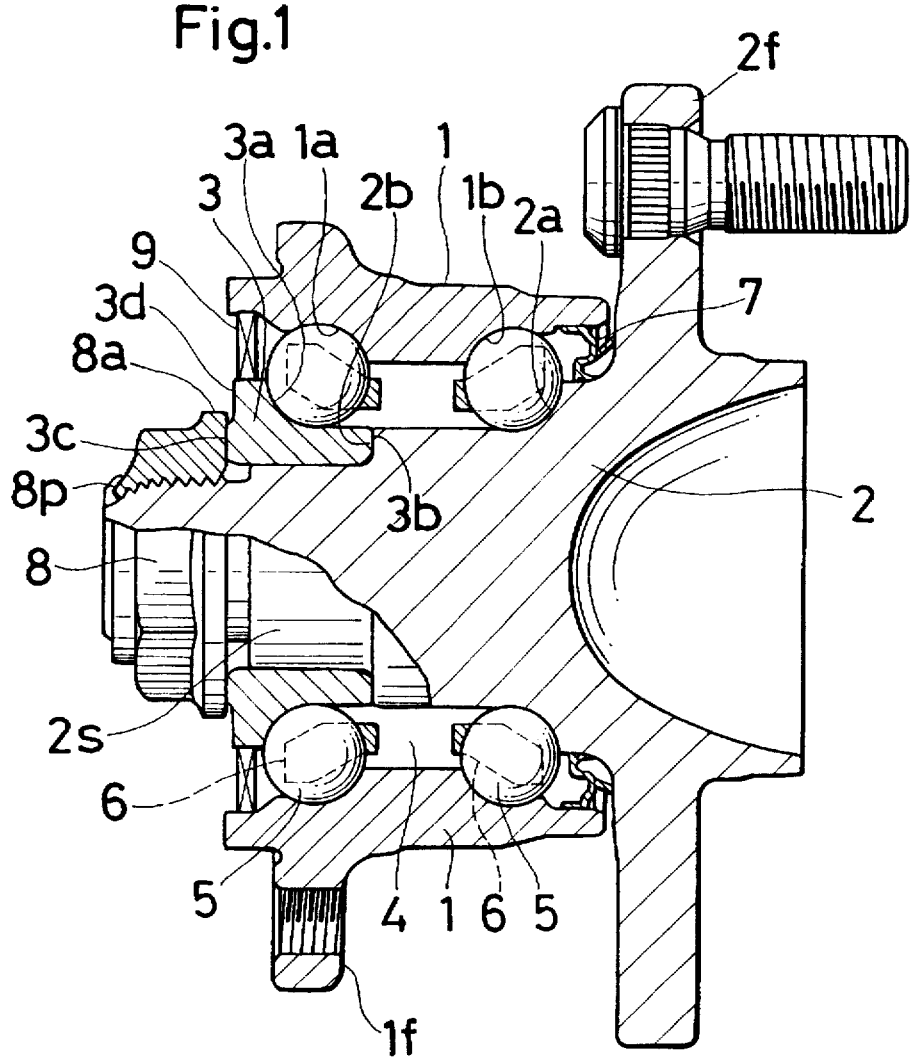
FIG. 1 is a section view of the wheel bearing device of the invention.

FIG. 1 is a section view of the wheel bearing device of the invention. In order to avoid duplicated description, identical components will be described by using the same reference numerals used in the description of the prior art. The wheel bearing device comprises: an outer race 1 which has a flange portion 1f in an outer side and which is to be attached to the body of an automobile; an inner race 2 which has a flange portion 2f in an outer side and to which a wheel (not shown) is to be attached; an inner race member 3 which is fittingly fixed to a shaft 2s of the inner race 2; balls 5 which are disposed in an annular space 4 between the outer race 1, and the inner race 2 and the inner race member 3; cages 6; seal members 7 and 9 which seal the annular space 4; and a nut 8 which fixes the inner race member 3 to the inner race 2 by a constant axial force.

Raceway surfaces 1a and 1b are formed on the inner peripheral face of the outer race 1. Also, raceway surfaces 2a and 3a are formed on the outer periphery of the inner race 2 and the outer peripheral face of the inner race member 3, respectively. The outer race 1 serves also as a housing, and the inner race 2 serves also as a shaft. After the inner race member 3 is tightened and fixed, a part 8p of the nut 8 is caulked into the shaft 2s of the inner race 2 so that the nut 8 is hardly moved.

Figure 2:
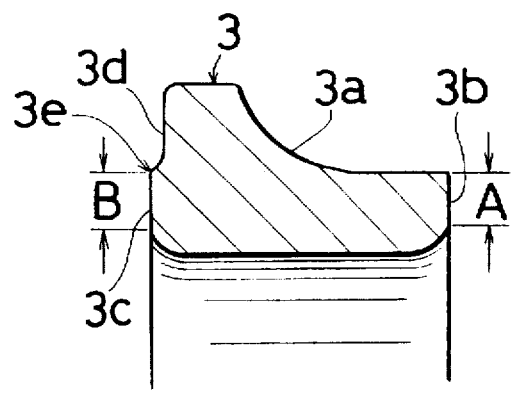
FIG. 2 is a partial section view of an inner race member constituting the wheel bearing device of the invention.
Figure 3:
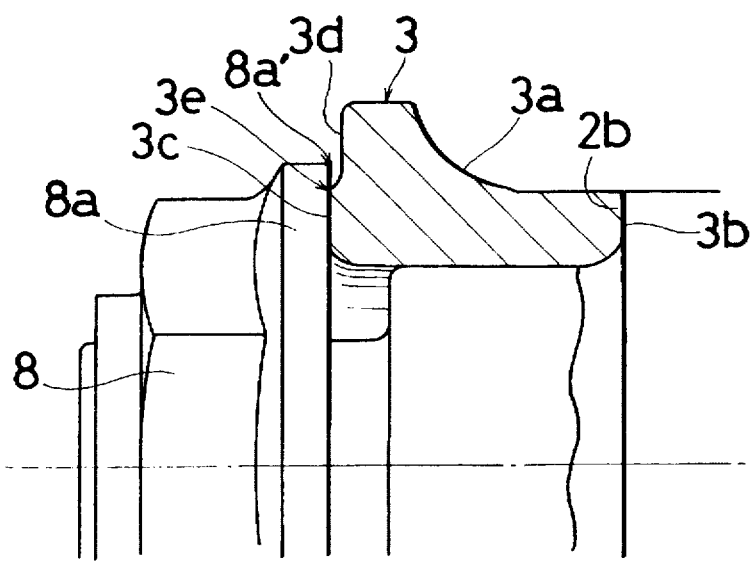
FIG. 3 is a partial section view showing a state in which the inner race member constituting the wheel bearing device of the invention is fittingly fixed to an inner race and tightened by a nut.
Figure 4:
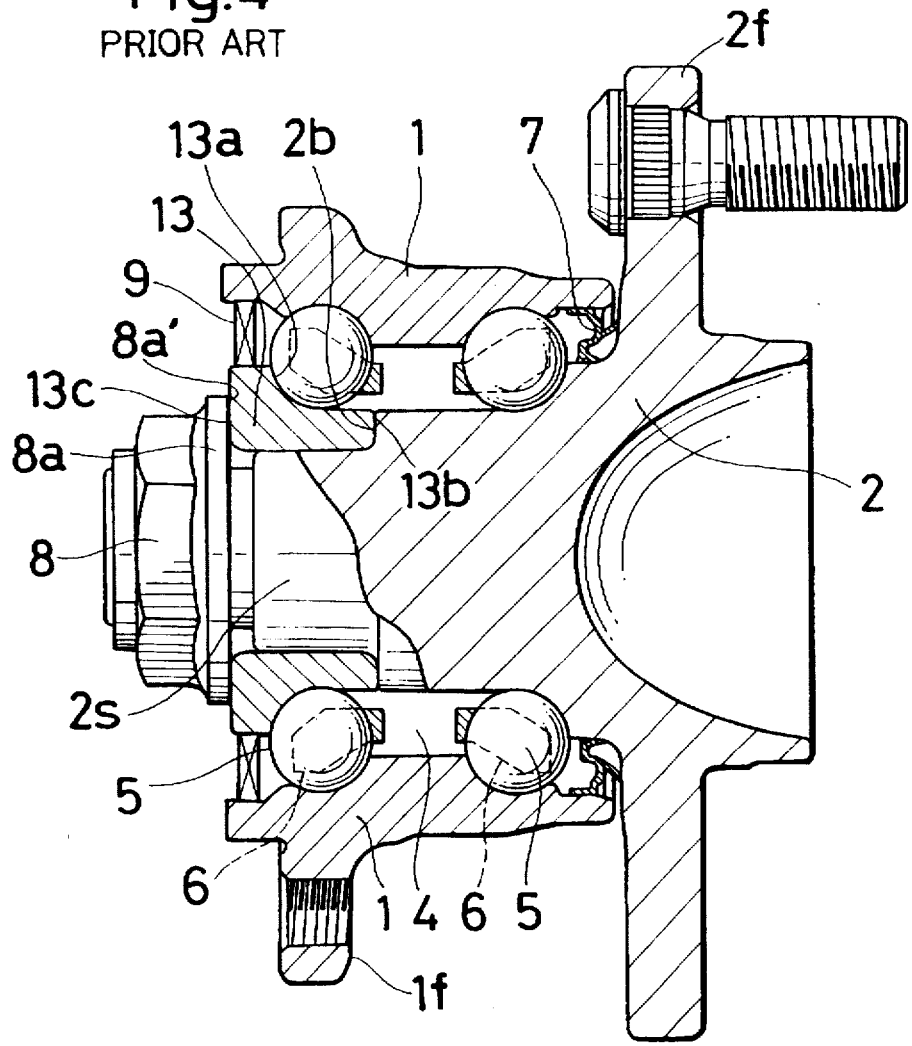
FIG. 4 is a section view of a wheel bearing device of the prior art.
Figure 5:
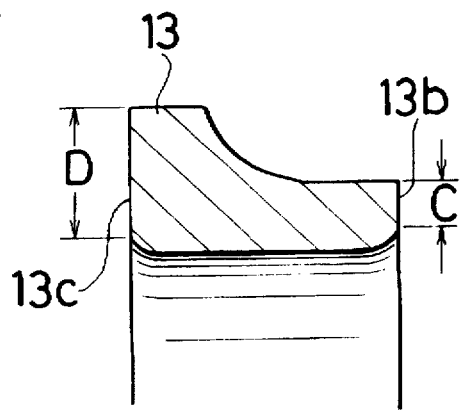
FIG. 5 is a partial section view of an inner race member used in the wheel bearing device of the prior art.

FIG. 2 is a partial section view of the inner race member 3, and FIG. 3 is a partial section view showing a state in which the inner race member 3 is fittingly fixed to the inner race (not shown) and tightened by the nut 8.

One end face 3b of the inner race member 3 abuts against a step portion 2b formed on the inner race 2, and the other end face 3c abuts against a bearing surface 8a of the nut 8. In this case, a step portion 3d is formed in the outer portion of the end face 3c which abuts against the bearing surface 8a of the nut 8, thereby preventing the end face from directly abutting against the end 8a' of the bearing surface 8a of the nut 8. In other words, the step portion 3d is formed so that an outer peripheral end 3e of the end face 3 abutting against the bearing surface 8a of the nut 8 is positioned inside the bearing surface 8a of the nut. In the inner race member 3, the radial length A of the end face 3b which abuts against the step portion 2b of the inner race 2 is substantially equal to the radial length B of the end face 3c which abuts against the bearing surface 8a of the nut 8, so that the areas of the end faces 3b and 3c are substantially equal to each other.

When the end faces 3b and 3c of the inner race member 3 are formed so as to have a substantially same area, the cutting amounts in a polishing process are substantially equal to each other and hence the process is facilitated, thereby improving the process accuracy. When the step portion 3d is formed on the side face of the inner race member 3 which abuts against the bearing surface 8a of the nut 8 so that the areas of the end faces 3b and 3c are substantially equal to each other, and the inner race member is fitted onto the shaft 2s of the inner race 2 and tightened by the nut 8, the end 8a' of the bearing surface of the nut 8 where burs may be formed does not make direct contact with the end face 3c of the inner race member 3. Therefore, the axial force exerted when the inner race member 3 is tightened to the inner race 2 is constant, and hence the accuracy of the assembly of the wheel bearing device can be easily controlled.

As described above in detail, according to the wheel bearing device of the invention, a simultaneous process during a process of polishing the inner race member can be facilitated and the process accuracy is improved. When the inner race member is fitted onto the shaft of the inner race and tightened by the nut, burrs are not bitten between the end of the bearing surface of the nut and the inner race member. Therefore, the axial force is not adversely affected, and hence can be stabilized.

What is claimed is:

1. A wheel bearing device comprising: an outer race which serves also as a housing; an inner race which serves also as a shaft; an inner race member which is fittingly fixed to said shaft which is said inner race; rolling elements and a cage which are disposed in an annular space between said outer race, and said inner race and said inner race member; and a nut which fixes said inner race member to said inner race by an axial force, wherein said inner race member is formed so that an area of an end face abutting against a step portion of said shaft of said inner race is substantially equal to an area of an end face abutting against a bearing surface of said nut, and said step portion is formed so that an outer peripheral end of said end face abutting against said bearing surface of said nut is positioned inside an end of said bearing surface of said nut.

* * * * *